Sept. 16, 1969 R. W. CHRISTENSEN 3,466,748
ANCHOR SCREW FOR DENTAL PROSTHESIS
Filed Dec. 15, 1967
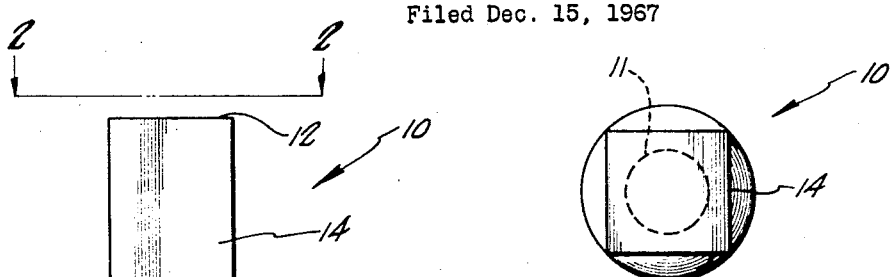
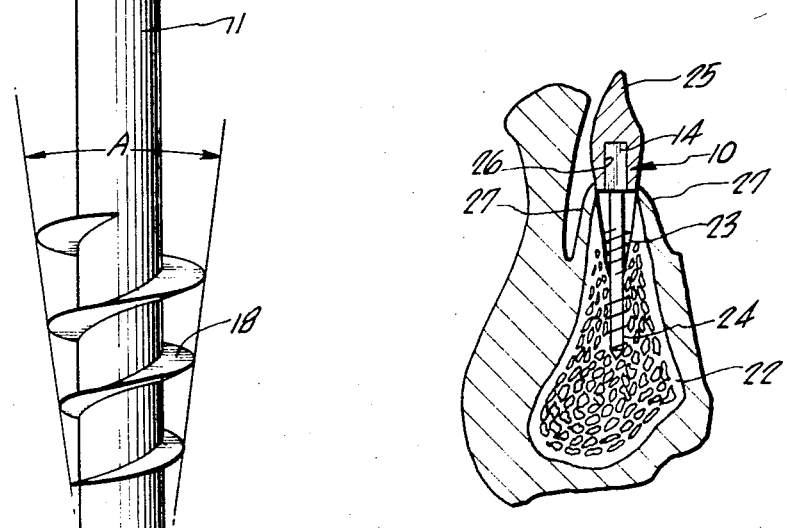
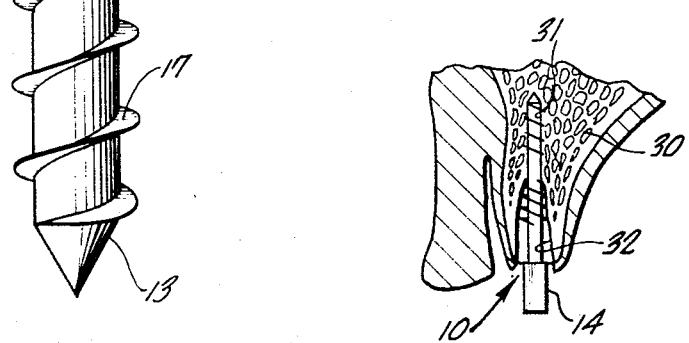
INVENTOR.
ROBERT W. CHRISTENSEN
BY
Christie, Parker & Hale
ATTORNEYS _United States Patent Office_ 3,466,748
Patented Sept. 16, 1969

3,466,748
ANCHOR SCREW FOR DENTAL PROSTHESIS
Robert W. Christensen, 250 S. Oak Knoll, Apt. 105,
Pasadena, Calif. 91106
Filed Dec. 15, 1967, Ser. No. 690,912
Int. Cl. A61c *13/30*
U.S. Cl. 32—10                                7 Claims

ABSTRACT OF THE DISCLOSURE

An anchor screw for mounting an artificial tooth crown or similar dental appliance, the screw having two separate sections of threads along its length. An apical or intra-bone end of the screw has threads of constant major diameter which engage bone surrounding a pilot hole drilled through the end of a root socket from which a tooth has been extracted. A central part of the screw has tapered threads which fit into the exposed root socket. Regenerated bone grows between these tapered threads to secure the screw firmly in place. An occlusal end of the screw extends from the bone and has a square cross-section to provide a gripping surface during screw installation and a rotation-resistant mounting for the artificial crown or other appliance.

Background of the invention

When a natural tooth must be extracted due to injury, disease or other deterioration, the dentist is faced with the problem of providing a structurally sound and aesthetically acceptable anchoring attachment in the mouth for securing in place an artificial tooth crown or other prosthetic appliance. Replacement of the extracted tooth with a prosthesis is desirable to maintain the patient's ability to chew food, to preserve a normal facial appearance, and to prevent erosion of the gum tissue and bone structure in the extraction gap.

Many different anchoring methods and appliances are available to secure an artificial crown or other prosthesis in place. A technique which has found increasing acceptance in recent years involves the implementation of a threaded post or shaft in the jawbone underlying the extraction gap created when the defective tooth is removed. This type of mounting provides a very strong phosthesis mounting as it becomes rigidly implanted in the jawbone as the bone regenerates or grows around the threaded member.

In the past, intra-bone mounts have usually been installed after regenerated bone has filled the root socket of the removed tooth. A pilot hole is drilled in the regenerated bone, and the threaded post is secured in place. The drawback of this approach is the long delay between tooth extraction and the provision of an anchor for a replacement tooth crown.

Another method has been to place a shaft having tapered threads in the unhealed root socket. Bone eventually grows around the tapered threads to lock the shaft in the jawbone. While the bone is regenerating, however, the shaft is unstable and may shift in position within the root socket.

There thus exists a need for an anchoring appliance which can be installed in the root socket immediately after tooth extraction, and which has sufficient initial holding power to be stable and to avoid patient trauma while surrounding bone is being regenerated to lock the appliance in place. The anchor screw and installation method of this invention fulfill this need.

My anchor screw is for installation in a root socket which has been extended by drilling a pilot hole in the surrounding bone and generally along the axis of the socket. A set of constant-diameter threads are formed at one end of the screw, and these threads fit snugly into the pilot hole to secure the screw in the jawbone. A central part of the anchor screw includes tapered threads which fit in the root socket. Regenerated bone grows around and between the tapered threads to lock the screw in place. An artificial crown or other prosthesis is then mounted on the end of the anchor screw which extends into the patient's mouth from the jawbone and overlying gum tissue.

Summary of the invention

Briefly stated, this invention contemplates an anchor screw for a dental prosthesis, the anchor screw comprising an elongated shaft formed from an implantable material and having first and second ends. The shaft includes a non-circular portion adjacent the first end to provide an anchorage for the prosthesis. The shaft also includes first and second externally threaded sections, the first section being adjacent the second end and having threads with a substantially constant major diameter. The second section is disposed between the first section and the first end, and defines tapering threads with a major diameter which decreases as the threads extend toward the first section.

Preferably, the non-circular portion shaft has a square cross-section, and the second end of the shaft tapers substantially conically to a point. In a preferred form, the threads in the second section have a major cone with an apex angle of about 15 degrees, and the threads in the first and second sections each extend at least 720 degrees around the shaft and each have a constant minor diameter.

In method terms, the invention contemplates a process for implanting an anchor screw in a jawbone of a patient. A defective tooth is extracted from the jawbone to expose a root socket. An elongated pilot hole is then formed in the jawbone at the bottom of the root socket. An anchor screw is next threaded into the pilot hole, the anchor screw having a first section defining threads of constant major diameter for engagement with the bone surrounding the pilot hole. The anchor screw further has a section of tapered threads fitting into the root socket, and the screw is installed soon enough after the extraction that substantial regeneration of bone in the root socket does not occur until after the screw is implated.

Brief description of the drawings

The invention will be described in detail with reference to the attached drawings, in which:

FIG. 1 is a side view of an anchor screw according to the invention;

FIG. 2 is a view of an occlusal end of the anchor screw taken on the lines 2—2 of FIG. 1;

FIG. 3 is a sectional elevation of an anchor screw implanted in a lower jawbone and having a tooth crown installed thereon; and FIG. 4 is a sectional elevation of an anchor screw implanted in an upper jaw.

Description of the preferred embodiment

Referring to FIGS. 1 and 2, an anchor screw 10 according to the invention is formed from an elongated shaft 11 having a first or occlusal end 12 and a second or apical end 13. A portion of the shaft adjacent the occlusal end defines an enlarged head 14 having a square cross-section as best seen in FIG. 2. Preferably, apical end 13 is conically tapered to form a pointed leading end on the shaft.

Shaft 11 includes a first threaded section 17 adjacent its apical end, and a second threaded section 18 disposed between enlarged head 14 and the first threaded section. Both sets of threads preferably have a constant minor diameter, and these two minor diameters are preferably equal. That is, the portion of shaft 11 from which the threads extend is a constant-diameter shaft with a circular cross-section. This form of shaft is preferred for its improved strength as compared to a tapered shaft.

The threads in first threaded section 17 are straight (untapered) threads having a constant major diameter (for a straight thread, the "major diameter" is the diameter of an imaginary cylinder coaxial with the shaft and just touching the thread crest). The threads in the second threaded section 18 are tapered, and having a maximum diameter adjacent enlarged head 14. The major diameter (for a tapered thread, the "major diameter" is the diameter at a given position on the thread axis of the major cone at that position; the major cone is described below) of these threads steadily decreases as the threads extend toward first threaded section 17, and the tapered threads terminate short of the threads in the first threaded section to define a short unthreaded section 19 on the shaft. The purpose of the unthreaded section is to permit the use of simplified tooling and machining procedures in producing the anchor screw.

The tapered threads in the second threaded section 18 have a major cone with an apex angle A (see FIG. 1) of about 15 degrees. The major cone is a conical surface coaxial with the shaft and just touching the crest or peripheral edges of the threads in the second section. The major-cone apex angle of 15 degrees is selected because it duplicates the apex angle of an average root socket in the human jaw. Although there is considerable variation in the taper of individual root sockets, studies have shown that most sockets have an apex angle in the range of 8 degrees to 20 degrees. The threads in second section 18 are thus tapered to correspond to the average taper which will be encountered when the anchor screw is threaded into a root socket vacated by an extracted tooth.

To insure proper anchoring of the screw in a root socket, the threads in sections 17 and 18 each preferably extend at least 720 degrees around the shaft. The threads in sections 17 and 18 have the same pitch to avoid any interference with a self-threading action of the threads in the first section if the threads in the second section contact the walls of the root socket during installation of the screw.

In a typical unit which has been produced, both sets of threads have a pitch of twelve threads per inch, and a minor diameter of 0.062 inch. The untapered threads in the first threaded section have a constant major diameter of 0.125 inch. The tapered threads in the second threaded section have a minimum major diameter of 0.125 inch, and this major diameter increases as the threads extend toward the enlarged head of the anchor screw. The anchor screw has an overall length of about 1.125 inch, and the threads in section 17 preferably extend along at least one-fourth inch of the shaft to insure adequate initial anchoring of the screw.

The screw is preferably formed of a titanium alloy composed of 90% titanium, 6% aluminum and 4% vanadium. However, the screw can also be formed from other implantable materials such as zirconium, tantalum, surgical steels, vitallium, or similar metals or alloys.

FIG. 3 shows the anchor screws installed in a lower jawbone 22 from which a tooth (not shown) has been extracted to expose a tapered root socket 23. After extraction of the tooth, the denist drills a pilot hole 24 into the bone at the bottom of the root socket. The pilot hole has a diameter corresponding to the minor diameter of the threads on the anchor screw. That is, for a screw having the dimensions specified above, this pilot hole would have a diameter of 0.062 inch.

The anchor screw is then positioned in the root socket, and is rotated so the straight threads in the first threaded section 17 cut their way into the bone surrounding the pilot hole. The anchor screws are thus drawn into the root socket, and the threads in second threaded section 18 fit snugly within the root socket above the pilot hole. If the root socket has a smaller-than-average taper, the threads in the second section will extend slightly into the bone surrounding the root socket and will tend to strengthen the anchoring of the screw in the jawbone. If the root socket has a greater-than-average taper, the threads in the second section wil not contact the walls of the root socket, but adequate anchoring and stability is still provided by the threads in the first threaded section.

When the anchor screw has been secured in place, no further steps are taken until bone surrounding the root socket has regenerated and grown into the spaces between the tapered threads in section 18. During this period of bone growth, the anchor screw is solidly locked in place by the straight threads of the first threaded section which are engaged with the walls of the pilot hole. When the bone regeneration is complete, a conventional tooth crown 25 having a socket 26 configured to fit over enlarged head 14 is cemented or otherwise secured to the top of the anchor anchor screw. As shown in FIG. 3, the crown is preferably positioned approximately level with the top of the jawbone, and the crown extends below gum tissue 27 which covers the jawbone.

The anchor screw is also suitable for use in an upper jaw 30 as shown in FIG. 4. The installation technique in the upper jaw is similar to that described above, and includes drilling of a pilot hole 31 in the bottom of a root socket 32 exposed after a tooth (not shown) is extracted. The anchor screw finds primary application in the single-root teeth forward of the bicuspids in the two dental arches, but can also be used in the posterior root sockets if proper precautions are taken to avoid interfering with the nerves and blood vessels in this regin of the jawbone. When the anchor screw is used in a root socket vacated by a multiple-root tooth such as a molar, it may sometimes be necessary to form the pilot hole in a portion of the jawbone off the normal axis of the root canal. Proper location of the pilot hole is readily determined by inspection, and the pilot drill is easily guided using conventional techniques.

Although the anchor screw has been illustrated with an enlarged head 14 having a square cross-section, other shapes of this head are also useful. The purpose of the enlarged head is to provide a convenient gripping surface for a wrench used for rotative installation of the anchor screw in the jawbone. The enlarged head also furnishes a mounting post for a tooth crown or other prosthesis which is eventually mounted on the screw. In some applications, these functions can also be satisfied with a hexagonal socket formed in the occulsal end of the anchor-screw shaft. Other types of non-circular cross-sections may also be used in the enlarged head to provide a wrenching surface as well as a convenient mount for the prosthesis.

There has been described an anchor screw which is adapted for immediate installation in a jawbone after a defective tooth has been extracted. The threads at the apical end of the screw insure that the screw is solidly anchored in place while bone regeneration takes place in the voids between the tapered threads in the root canal. When bone growth is complete, the anchor screw provides a very rigid and solid mounting for a dental crown or other prosthetic appliance. The installation is quick and simple, patient trauma is minimized, and a very rigid mounting post is provided in the patient's mouth for subsequent installation of a prosthesis.

What is claimed is:

1. An anchor screw for mounting in a jawbone to anchor a dental prosthesis, comprising an elongated shaft formed from an implantable material and having first and second ends, the shaft defining an elongated mounting head adjacent the first end to receive and provide an anchorage for the prosthesis, the shaft further defining first and second externally threaded sections, the first section being adjacent the second end and having threads with a substantially constant major diameter, the second section being disposed between the first section and the elongated mounting head and having tapering threads with a major diameter which decreases as the threads extend toward the first section, the anchor screw being adapted to fit into a jaw-bone root socket of a natural tooth with the first section threaded into the bone to support the second section in the root socket whereby regenerating bone can form between the tapered threads of the second section.

2. The anchor screw defined in claim 1 in which the threads in the second section have a major cone with an apex angle of about 15 degrees.

3. The anchor screw defined in claim 1 in which the threads in the first and second sections each extend at least 720 degrees around the shaft.

4. The anchor screw defined in claim 1 in which threads in the first and second sections each have the same minor diameter.

5. The anchor screw defined in claim 1 in which the first and second threaded sections are separated by an unthreaded portion of the shaft.

6. The anchor screw defined in claim 1 in which the elongated mounting head has a square cross-section, the second end of the shaft tapers to a point, the threads in the second section have a major cone with an apex angle of about 15 degrees, and the threads in the first and second sections each extend at least 720 degrees around the shaft and each have the same minor diameter.

7. A process for implanting an anchor screw for a dental prosthesis in a jawbone of a patient, comprising the steps of:
(a) extracting a defective tooth from the jawbone to expose a root socket;
(b) forming an elongated pilot hole in the jawbone at the bottom of the root socket;
(c) threading the anchor screw into the pilot hole, the anchor screw having a first section carrying threads of constant major diameter for engagement with the bone surrounding the pilot hole, and having a second section with tapered threads fitting in the root socket, the screw being so installed soon enough after the extraction that substantial regeneration of bone in the root socket does not occur until after the screw is implanted.

References Cited
UNITED STATES PATENTS

| | | | |
|---|---|---|---|
| 205,990 | 7/1878 | Armstrong | 85—41 |
| 1,213,587 | 1/1917 | Chester | 32—13 |
| 2,857,670 | 10/1958 | Kiernan | 32—10 |

ROBERT PESHOCK, Primary Examiner